Patented Apr. 9, 1929.

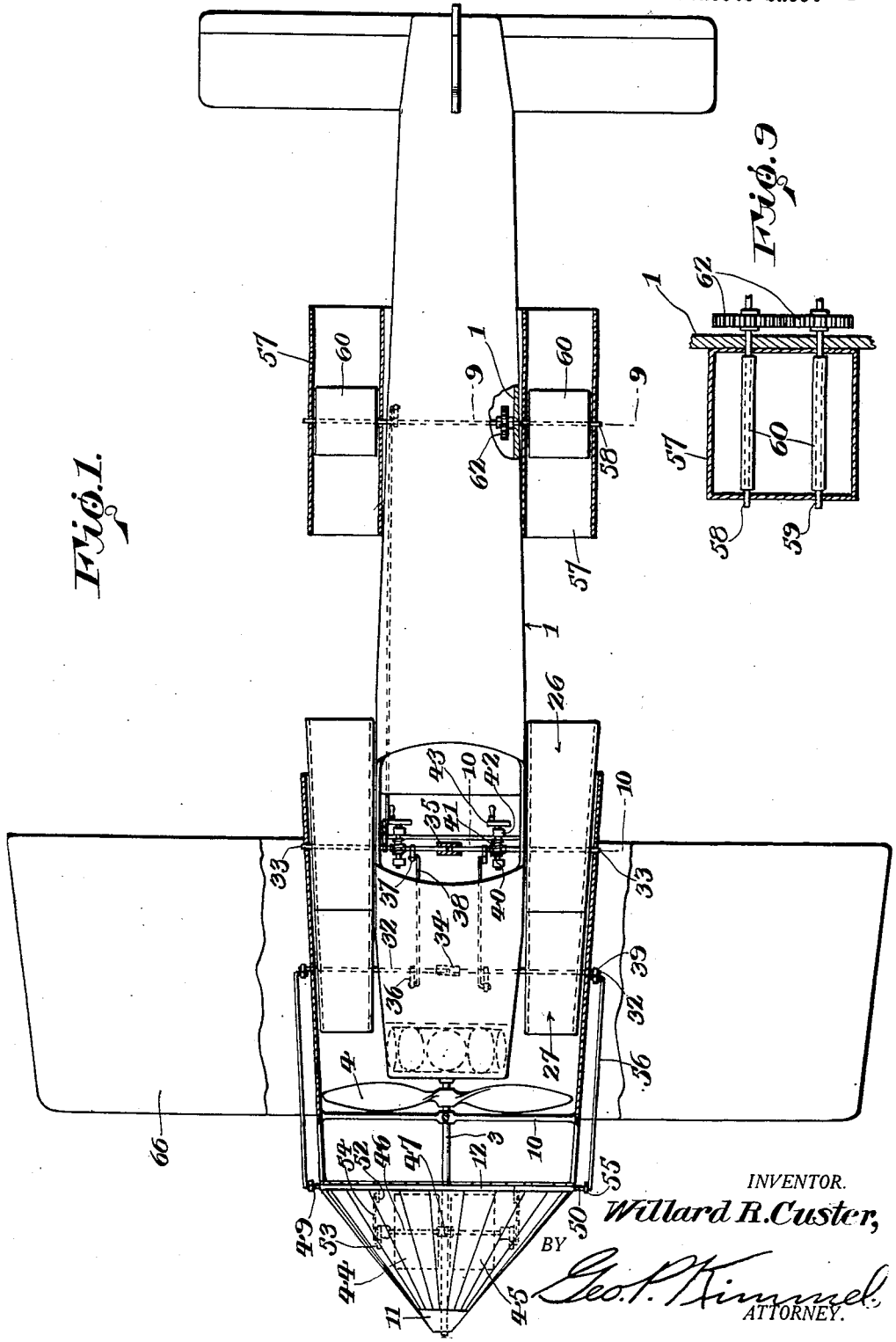

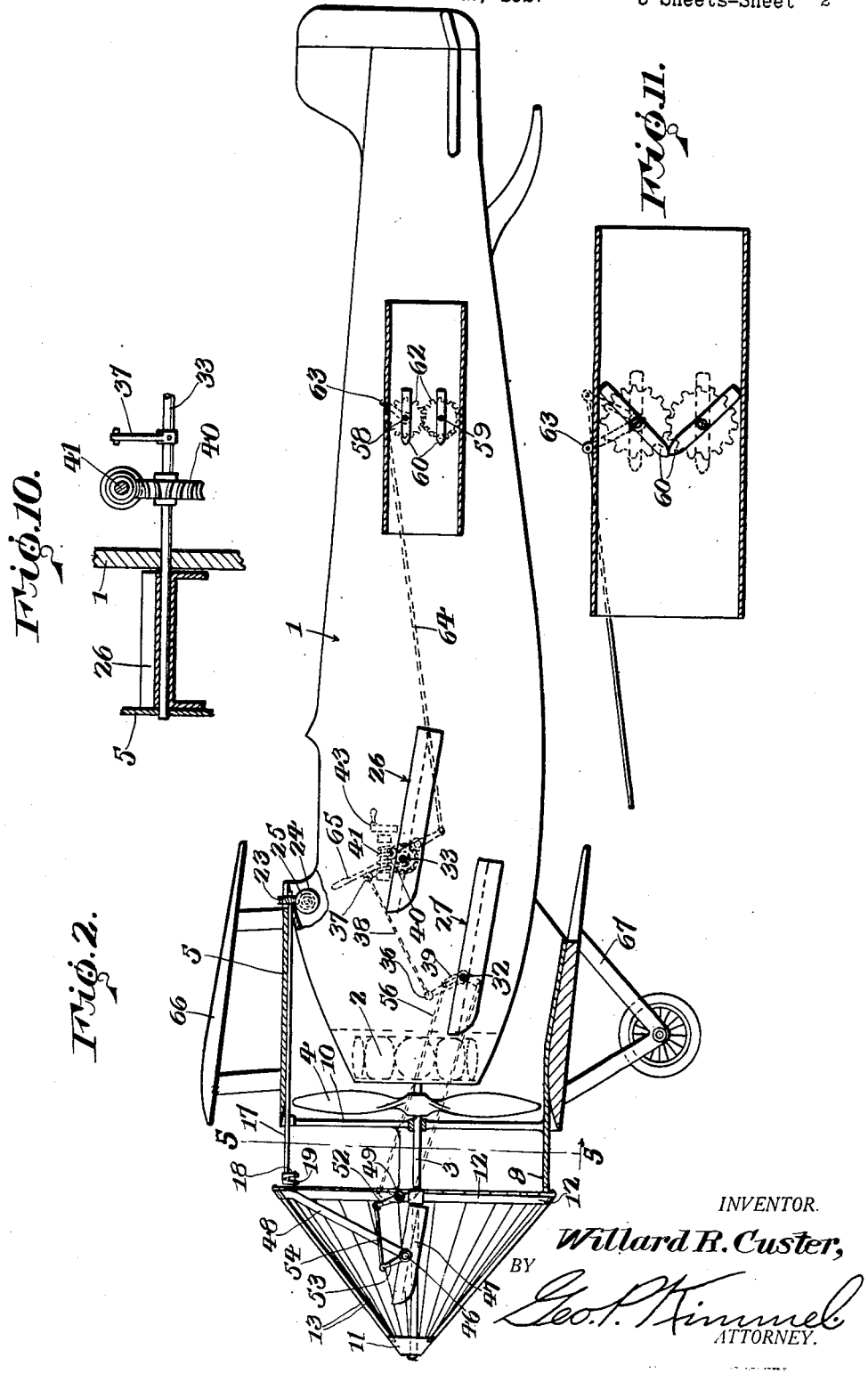

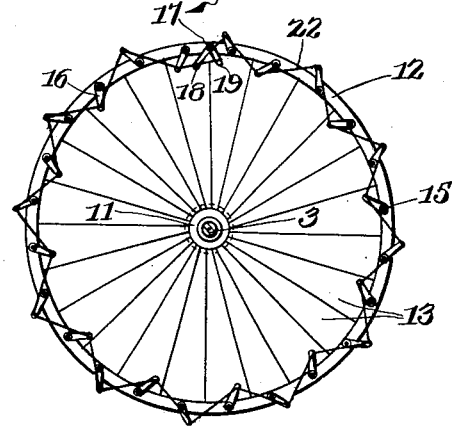
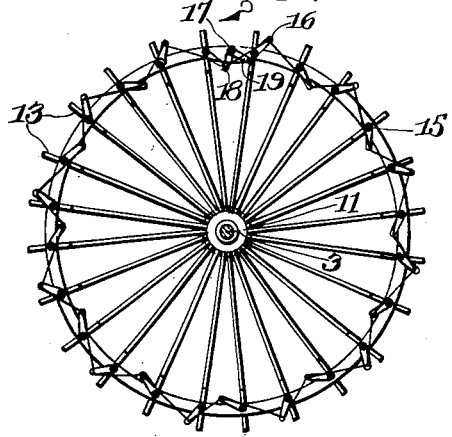
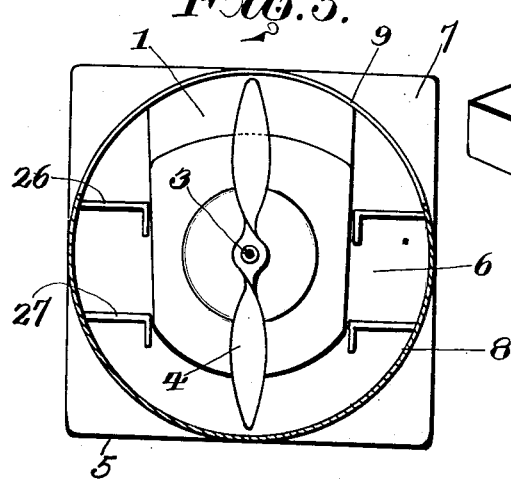
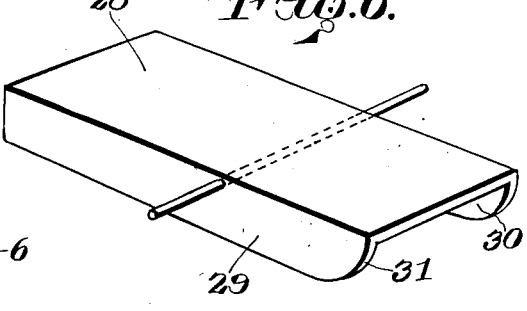
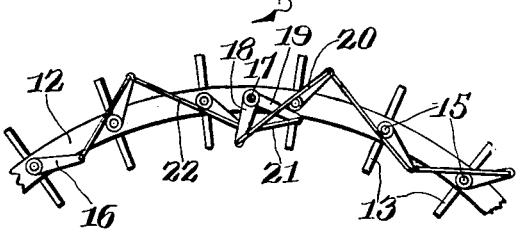

1,708,720

UNITED STATES PATENT OFFICE.

WILLARD R. CUSTER, OF WASHINGTON, DISTRICT OF COLUMBIA.

AEROPLANE.

Application filed December 22, 1927. Serial No. 241,879.

This invention relates to aeroplanes, but more particularly to a take-off control therefor, and the invention has for its object to provide, in a manner as hereinafter set forth a take-off controlling mechanism to cause the expeditious lifting of the vessel to the desired altitude from a standstill.

A further object of the invention is to provide, in a manner as hereinafter set forth, a take-off control to cause the vertical lifting of the vessel from a standstill to the desired altitude, under such conditions preventing when taking off the travel of the vessel forwardly on a runway or field.

Further objects of the invention are to provide, in a manner as hereinafter set forth, a take-off controlling mechanism for aeroplanes which is simple in its construction and arrangement, strong, durable, compact, thoroughly efficient in its use, conveniently adjusted, readily installed with respect to the aeroplane, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a sectional plan of an aeroplane showing the adaptation therewith of a take-off controlling means in accordance with this invention.

Figure 2 is a longitudinal sectional view of the plane installed with controlling means in accordance with this invention.

Figure 3 is a rear elevation of the air shut-off element when closed.

Figure 4 is a rear elevation of the air shut-off element when open.

Figure 5 is a section on line 5—5 Figure 2.

Figure 6 is a perspective view of one of the lifting members.

Figure 7 is a fragmentary view in elevation illustrating the means for simultaneously opening and closing the shutters of the air shut-off elements.

Figure 8 is a perspective view of one of the shutters of the air shut-off elements.

Figure 9 is a section on line 9—9 Figure 1.

Figure 10 is a fragmentary view in section illustrating the adjusting means for the lifting planes.

Figure 11 is a fragmentary view in section illustrating a brake device.

Referring to the drawings 1 denotes a fuselage having arranged therein, at its forward end, motors 2 for driving a shaft 3 carrying a propeller 4 which is arranged in advance of the forward end of the fuselage 1. Surrounding the forward end of the fuselage 1, as well as projecting forwardly therefrom is a housing 5. The fuselage 1, at its top, is secured to the inner face of the upper portion of the housing 5. The size of the forward end of the fuselage 1 with respect to the housing 5 is such to provide an air passage 6 surrounding the sides and bottom of the fuselage. The forward end of the housing 5 at the corners thereof, is formed with inwardly extending flanges 7 of triangular contour. Integral with the flanges 7 is a forwardly directed cylindrical shell 8 having its top cut away to provide an air intake opening 9. The flanges 7 close that portion of the front of the housing 5 between the shell 8 and the sides, top and bottom of said housing.

Secured to the forward end of the shell 8 is a sectional, conoidal shaped nose providing an air shut-off element. Arranged within and secured to the forward end of the housing 5 is a combined bracing and supporting spider 10 providing a bearing for the shaft 3. The spider 10 is positioned rearwardly of and spaced from the air shut-off element. The shaft 3 extends through the air shut-off element and has its forward end journaled in the forward end of such element.

The air shut-off element includes an annular, frusto-conical block 11 which provides a bearing for the forward end of the shaft 3.

Said element further includes a ring 12 of materially greater diameter than the block 11 and which is spaced rearwardly, an appropriate distance from the latter. Arranged between the block 11 and the ring 12 is a set of tapered, pivoted shutters 13 employed for closing the air shut-off element when desired. The forward end of each shutter 13 is provided with a pivot 14 mounted in the block 11. The rear end of each shutter 13 is provided with a pivot 15 of greater length than the pivot 14 and which extends through and projects rearwardly from the ring 12. The shutters 13 incline inwardly from the ring 12 to the block 11.

The shutters 13 are simultaneously opened and closed and for such purpose each pivot 15 has its rear end provided with a crank arm 16. The crank arm 16 carried by one pivot 15 is angularly disposed with respect to the crank arm carried by an adjacent pivot 15. Journaled at its forward end, in the ring 12, is a shaft 17 employed for operating an opening and closing means for the shutters. The shaft 17 at its forward end carries a bell crank having the arms thereof indicated at 18, 19. The arm 18 is connected to one of the crank arms 16 by an inclined link 20. The arm 19 is connected to another of the crank arms 16 by an inclined link 21. The crank arms 16 are connected together by inclined links 22. The opening and closing means for the shutters comprises the bell crank carried by the shaft 17 and the links 20, 21 and 22. When the shaft 17 is operated in one direction the shutters are simultaneously swung to open position and when operated in the other direction the shutters are simultaneously shifted to closed position. The shaft 17 extends rearwardly and into the housing 5 and carries at its rear end a worm pinion 23 meshing with a worm shaft 24 provided with an operating wheel 25. The shutters are closed when the aviator is taking off from a standstill.

Arranged at each side of the forward portion of the fuselage is a pair of lifting members. The planes of each pair are arranged one above the other, spaced a substantial distance from each other and the lower one extends a substantial distance forwardly from the upper one. See Figure 2. The planes of each pair are indicated at 26, 27 and each of which consists of a rectangular body portion 28 provided with a pair of depending lengthwise extending flanges 29, 30 having the forward ends thereof rounded as at 31. The flanges 29 and 30 are co-extensive with the body portion 28. Each pair of lifting planes is independently adjustable. The lifting planes of each pair are simultaneously adjustable. One pair of lifting planes is interposed between the fuselage and one side wall of the housing 5 and the other pair of lifting planes is interposed between the fuselage and the other side wall of the housing 5. The lower lifting plane of each pair is carried by a shaft 32 and the upper lifting plane of each pair by a shaft 33. The shafts 32 are arranged in lengthwise alignment and extend into a bearing member 34 which is common to the inner ends of said shaft 32. The shafts 33 are arranged in lengthwise alignment and common to the inner ends thereof is a bearing member 35. The shafts 32 are not fixedly connected together, and the shafts 33 are arranged in a like manner. The shafts 32 extend into the fuselage and through the side walls of the housing 5. The shafts 33 extend into the fuselage and have their outer ends journaled in the side walls of the housing 5. Each shaft 32 is provided with a crank arm 36 is proximity to its inner end and each shaft 33 is provided with a crank arm 37 in proximity to its inner end. The crank arm 36 of a shaft 32 is connected to the crank arm 37 of a shaft 33 by a connecting rod 38 to provide for the simultaneously shifting of said connected shafts. Each shaft 32 projects from a side wall of the housing 5 and carries on its projecting end a crank arm 39.

Each shaft 33 is provided in proximity to the crank arm 37 carried thereby with a worm 40 which meshes with a worm shaft 41 journaled in bearings 42 and provided with an operating wheel 43. On the shifting of the wheel 43 a shaft 41 will be rotated, thereby rotating a shaft 33 which in turn will shift that shaft 32 to which it is connected. The shifting of the shafts 32 and 33 is employed for the purpose of angularly adjusting the lifting planes or members 26, 27.

Arranged within the air-shut-off element is a pair of sustaining planes 44, 45. Each sustaining plane is carried by a shaft 46. The shafts 46 at their inner ends are mounted in a bearing member 47. Hangers 48 are provided for the shafts 46. Journaled in the ring 12 are lengthwise opposed shafts 49, 50, having their inner ends connected together in the same manner as the inner ends of the shafts 33. Each shaft 49, 50 carries a crank arm 52 and each shaft 46 carries a crank arm 53. The crank arms 52, 53 are connected together by a link 54. The shafts 49, 50 project outwardly from the ring 12 and each is provided with a crank arm 55 connected by a bar 56 to a crank arm 39. The sustaining planes are independently adjustable. One sustaining plane is simultaneously adjusted with a pair of lifting planes and the other sustaining plane is simultaneously adjusted with the other pair of lifting planes.

Arranged at each side of the fuselage a substantial distance rearwardly of the housing 5 is a brake device and as each of said devices is of the same construction, but one will be described as the description of one will apply to the other. Each brake device comprises a tubular member 57 open at each end, and preferably of polygonal cross section. Common to the members 57 is a shaft 58 which extends through the fuselage and is journaled in each of said members below the top thereof. Positioned in each member 57 below the shaft 58 is a shaft 59. Within the member 57 is arranged a pair of valves 60, carried by the shafts 58, 59. The valves are oppositely disposed with respect to each other and are shifted to abutting engagement to provide an abutment and to close the member 57. The normal position of the valves 60 is as shown in Figure 11. The shafts 58, 59 carry pinions 62 which are in permanent mesh with each other. The shaft 58 is provided with a crank arm 63, connected to a pull rod 64, which is operated by a lever member 65. The rod 64 is attached to the lower end of the lever member 65. See Figure 2. The lever member 65 is suitably supported within the fuselage. The main sustaining planes are indicated at 66 and the landing gear at 67.

When the aviator desires to take off, the air shut-off element 1 is closed. The motor is started and the air is sucked in by the propeller through the cutaway portion 9 at the top of the shell 8. The propeller drives the air backward against the planes 26, 27, which have been adjusted to the desired inclination and whereby a lifting action will be created causing the vessel to move upwardly without travelling forwardly. After the desired altitude has been reached, the air shut-off element is opened and at such time the propeller will act to drive the vessel forwardly or in the direction steered and the air is being drawn in through the shut-off element. The brake devices are closed during the take off, and opened after the vessel has reached the desired altitude. The planes 45, 46 act as a sustaining means for the nose after the shut-off element has been opened.

What I claim is:

1. An aeroplane comprising a fuselage, a housing connected to, enclosing and projecting from the forward end of the fuselage and providing an air space surrounding the sides and bottom of the fuselage at the forward portion thereof, a propeller operating within said housing forwardly of the fuselage, an air control mechanism arranged forwardly of said housing and having means to provide for the intake of air at the rear thereof in a direction at right angles to the axis of and forwardly of the propeller, lifting planes interposed between the sides of the fuselage and said housing and acted upon by the incoming air to lift the aeroplane from a standstill to a desired altitude.

2. An aeroplane comprising a fuselage, a housing connected to, enclosing and projecting from the forward end of the fuselage and providing an air passage surrounding the sides and bottom of the fuselage at the forward portion thereof, an air control mechanism arranged forwardly of said housing and having means at its rear to provide for the intake of air in its top in a direction at right angles to the axis of and forwardly of a propeller, and lifting planes interposed between the sides of the fuselage and said housing and acted upon by the incoming air to lift the aeroplane from a standstill to a desired altitude.

3. An aeroplane comprising a fuselage, a housing connected to, enclosing and projecting from the forward end of the fuselage and providing an air space surrounding the sides and bottom of the fuselage at the forward portion thereof, a propeller operating within said housing forwardly of the fuselage, an air control mechanism arranged forwardly of said housing and having means to provide for the intake of air at the rear thereof in a direction at right angles to the axis of and forwardly of the propeller, lifting planes interposed between the sides of the fuselage and said housing and acted upon by the incoming air to lift the aeroplane from the standstill to a desired altitude, and means for adjusting said air control mechanism when the aeroplane reaches the desired altitude to provide for the intake of air in the direction of the axis of the propeller.

4. An aeroplane comprising a fuselage, a housing connected to, enclosing and projecting from the forward end of the fuselage and providing an air passage surrounding the sides and bottom of the fuselage at the forward portion thereof, an air control mechanism arranged forwardly of said housing and having means at its rear to provide for the intake of air in its top in a direction at right angles to the axis of and forwardly of a propeller, lifting planes interposed between the sides of the fuselage and said housing and acted upon by the incoming air to lift the aeroplane from a standstill to a desired altitude, and means for adjusting said air control mechanism when the aeroplane reaches the desired altitude to provide for the intake of air in the direction of the axis of the propeller.

5. An aeroplane comprising a fuselage, a housing connected to, enclosing and projecting from the forward end of the fuselage and providing an air space surrounding the sides and bottom of the fuselage at the forward portion thereof, a propeller operating within said housing forwardly of the fuselage, an air control mechanism arranged forwardly of said housing and having means to provide for the intake of air at the rear thereof in a direction at right angles to the axis of and forwardly of the propeller, lifting planes interposed between the sides of the fuselage and said housing and acted upon by the incoming air to lift the aeroplane from a standstill to a desired altitude, said lifting planes arranged in pairs, the planes of each pair positioned over and in spaced relation with respect to each other and with the lower plane extending forwardly with respect to the upper plane, each of said planes having depending longitudinal flanges spaced from each other, and means for adjusting said planes.

6. An aeroplane comprising a fuselage, a housing connected to, enclosing and projecting from the forward end of the fuselage and providing an air passage surrounding the sides and bottom of the fuselage at the forward portion thereof, an air control mechanism arranged forwardly of said housing and having means at its rear to provide for the intake of air in its top in a direction at right angles to the axis of and forwardly of a propeller, lifting planes interposed between the sides of the fuselage and said housing and acted upon by the incoming air to lift the aeroplane from a standstill to a desired altitude, said lifting planes arranged in pairs, the planes of each pair positioned over and in spaced relation with respect to each other and with the lower plane extending forwardly with respect to the upper plane, each of said planes having depending longitudinal flanges spaced from each other, and means for adjusting said planes.

7. An aeroplane comprising a fuselage, a housing connected to, enclosing and projecting from the forward end of the fuselage and providing an air space surrounding the sides and bottom of the fuselage at the forward portion thereof, a propeller operating within said housing forwardly of the fuselage, an air control mechanism arranged forwardly of said housing and having means to provide for the intake of air at the rear thereof in a direction at right angles to the axis of and forwardly of the propeller, lifting planes interposed between the sides of the fuselage and said housing and acted upon by the incoming air to lift the aeroplane from a standstill to a desired altitude, means for adjusting said air control mechanism when the aeroplane reaches the desired altitude to provide for the intake of air in the direction of the axis of the propeller, said lifting planes arranged in pairs, the planes of each pair positioned over and in spaced relation with respect to each other and with the lower plane extending forwardly with respect to the upper plane, each of said planes having depending longitudinal flanges spaced from each other, and means for adjusting said planes.

8. An aeroplane comprising a fuselage, a housing connected to, enclosing and projecting from the forward end of the fuselage and providing an air passage surrounding the sides and bottom of the fuselage at the forward portion thereof, an air control mechanism arranged forwardly of said housing and having means at its rear to provide for the intake of air in its top in a direction at right angles to the axis of and forwardly of a propeller, lifting planes interposed between the sides of the fuselage and said housing and acted upon by the incoming air to lift the aeroplane from a standstill to a desired altitude, means for adjusting said air control mechanism when the aeroplane reaches the desired altitude to provide for the intake of air in the direction of the axis of the propeller, said lifting planes arranged in pairs, the planes of each pair positioned over and in spaced relation with respect to each other and with the lower plane extending forwardly with respect to the upper plane, each of said planes having depending longitudinal flanges spaced from each other, and means for adjusting said planes.

9. An aeroplane comprising a fuselage, a housing connected to, enclosing and projecting from the forward end of the fuselage and providing an air space surrounding the sides and bottom of the fuselage at the forward portion thereof, a propeller operating within said housing forwardly of the fuselage, an air control mechanism arranged forwardly of said housing and having means to provide for the intake of air at the rear thereof in a direction at right angles to the axis of and forwardly of the propeller, lifting planes interposed between the sides of the fuselage and said housing and acted upon by the incoming air to lift the aeroplane from a standstill to a desired altitude, and adjustable sustaining planes arranged within the forward portion of said mechanism, and means for adjusting said lifting planes.

10. An aeroplane comprising a fuselage, a housing connected to, enclosing and projecting from the forward end of the fuselage and providing an air passage surrounding the sides and bottom of the fuselage at the forward portion thereof, an air control mechanism arranged forwardly of said housing and having means at its rear to provide for the intake of air in its top in a direction at right angles to the axis of and forwardly of a propeller, lifting planes interposed between the sides of the fuselage and said housing and acted upon by the incoming air to lift the aeroplane from a standstill to a desired altitude, adjustable sustaining planes arranged within the forward portion of said mechanism, and means for adjusting said lifting planes.

11. An aeroplane comprising a fuselage, a housing connected to, enclosing and projecting from the forward end of the fuselage and providing an air space surrounding the sides and bottoms of the fuselage at the forward portion thereof, a propeller operating within said housing forwardly of the fuselage, an air control mechanism arranged forwardly of said housing and having means to provide for the intake of air at the rear thereof in a direction at right angles to the axis of and forwardly of the propeller, lifting planes interposed between the sides of the fuselage and said housing and acted upon by the incoming air to lift the aeroplane from a standstill to a desired altitude, means for adjusting said air control mechanism when the aeroplane reaches the desired altitude to provide for the intake of air in the direction of the axis of the propeller, adjustable sustaining planes arranged within the forward portion of said mechanism, and means for adjusting said lifting planes.

12. An aeroplane comprising a fuselage, a housing connected to, enclosing and projecting from the forward end of the fuselage and providing an air passage surrounding the sides and bottom of the fuselage at the forward portion thereof, an air control mechanism arranged forwardly of said housing and having means at its rear to provide for the intake of air in its top in a direction at right angles to the axis of and forwardly of a propeller, lifting planes interposed between the sides of the fuselage and said housing and acted upon by the incoming air to lift the aeroplane from a standstill to a desired altitude, means for adjusting said air control mechanism when the aeroplane reaches the desired altitude to provide for the intake of air in the direction of the axis of the propeller, adjustable sustaining planes arranged within the forward portion of said mechanism, and means for adjusting said lifting planes.

13. An aeroplane comprising a fuselage, a housing connected to, enclosing and projecting from the forward end of the fuselage and providing an air space surrounding the sides and bottom of the fuselage at the forward portion thereof, a propeller operating within said housing forwardly of the fuselage, an air control mechanism arranged forwardly of said housing and having means to provide for the intake of air at the rear thereof in a direction at right angles to the axis of and forwardly of the propeller, lifting planes interposed between the sides of the fuselage and said housing and acted upon by the incoming air to lift the aeroplane from a standstill to a desired altitude, adjustable sustaining planes arranged within the forward poriton of said mechanism, means for adjusting said lifting planes, and adjustable braking means carried by the fuselage and arranged rearwardly of said lifting planes.

14. An aeroplane comprising a fuselage, a housing connected to, enclosing and projecting from the forward end of the fuselage and providing an air passage surrounding the sides and bottom of the fuselage at the forward portion thereof, an air control mechanism arranged forwardly of said housing and having means at its rear to provide for the intake of air in its top in a direction at right angles to the axis of and forwardly of a propeller, lifting planes interposed between the sides of the fuselage and said housing and acted upon by the incoming air to lift the aeroplane from a standstill to a desired altitude, adjustable sustaining planes arranged within the forward portion of said mechanism, means for adjusting said lifting planes, and adjustable braking means carried by the fuselage and arranged rearwardly of said lifting planes.

15. An aeroplane comprising a fuselage, a housing connected to, enclosing and projecting from the forward end of the fuselage and providing an air space surrounding the sides and bottom of the fuselage at the forward portion thereof, a propeller operating within said housing forwardly of the fuselage, an air control mechanism arranged forwardly of said housing and having means to provide for the intake of air at the rear thereof in a direction at right angles to the axis of and forwardly of the propeller, lifting planes interposed between the sides of the fuselage and said housing and acted upon by the incoming air to lift the aeroplane from a standstill to a desired altitude, means for adjusting said air control mechanism when the aeroplane reaches the desired altitude to provide for the intake of air in the direction of the axis of the propeller, adjustable sustaining planes arranged within the forward portion of said mechanism, means for adjusting said lifting planes, and adjustable braking means carried by the fuselage and arranged rearwardly of said lifting planes.

16. An aeroplane comprising a fuselage, a housing connected to, enclosing and projecting from the forward end of the fuselage and providing an air passage surrounding the sides and bottom of the fuselage at the forward portion thereof, an air control mechanism arranged forwardly of said housing and having means at its rear to provide for the intake of air in its top in a direction at right angles to the axis of and forwardly of a propeller, lifting planes interposed between the sides of the fuselage and said housing and acted upon by the incoming air to lift the aeroplane from a standstill to a desired altitude, means for adjusting said air control mechanism when the aeroplane reaches the desired altitude to provide for the intake of air in the direction of the axis of the propeller, adjustable sustaining planes arranged within the forward portion of said mechanism, means for adjusting said lifting planes, and adjustable braking means carried by the fuselage and arranged rearwardly of said lifting planes.

17. An aeroplane comprising a fuselage, a housing connected to, enclosing and projecting from the forward end of the fuselage and providing an air passage surrounding the sides and bottom of the fuselage at the forward portion thereof, an air control mechanism arranged forwardly of said housing and having means at its rear to provide for the intake of air in its top in a direction at right angles to the axis of and forwardly of a propeller, and lifting planes interposed between the sides of the fuselage and said housing and acted upon by the incoming air to lift the aeroplane from a standstill to a desired altitude, said lifting planes provided with downturned flanges.

In testimony whereof, I affix my signature hereto.

WILLARD R. CUSTER.